US012141227B2

(12) United States Patent
Jiang et al.

(10) Patent No.: US 12,141,227 B2
(45) Date of Patent: *Nov. 12, 2024

(54) ADAPTIVE MATRIX MULTIPLICATION ACCELERATOR FOR MACHINE LEARNING AND DEEP LEARNING APPLICATIONS

(71) Applicant: Samsung Electronics Co., Ltd., Suwon-si (KR)

(72) Inventors: Dongyan Jiang, San Jose, CA (US); Dimin Niu, Sunnyvale, CA (US); Hongzhong Zheng, Los Gatos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 908 days.

This patent is subject to a terminal disclaimer.

(21) Appl. No.: 16/942,570

(22) Filed: Jul. 29, 2020

(65) Prior Publication Data

US 2020/0356375 A1     Nov. 12, 2020

Related U.S. Application Data

(63) Continuation of application No. 16/407,064, filed on May 8, 2019, now Pat. No. 11,475,102.
(Continued)

(51) Int. Cl.
  *G06F 17/16*     (2006.01)
  *G06F 9/38*      (2018.01)
  *G06F 9/50*      (2006.01)

(52) U.S. Cl.
  CPC ............ *G06F 17/16* (2013.01); *G06F 9/3802* (2013.01); *G06F 9/3893* (2013.01); *G06F 9/5027* (2013.01)

(58) Field of Classification Search
  CPC ...................................................... G06F 17/16
  See application file for complete search history.

(56) References Cited

U.S. PATENT DOCUMENTS 7,802,152 B2    9/2010   Brune et al.
8,051,124 B2   11/2011   Salama et al.
(Continued)

FOREIGN PATENT DOCUMENTS

CN     1648853 A     8/2005
CN   109144471 A     1/2019
(Continued)

OTHER PUBLICATIONS

U.S. Office Action dated Jan. 24, 2022, issued in U.S. Appl. No. 16/407,064 (12 pages).
(Continued)

*Primary Examiner* — Michael D. Yaary
(74) *Attorney, Agent, or Firm* — Lewis Roca Rothgerber Christie LLP

(57) ABSTRACT

An adaptive matrix multiplier. In some embodiments, the matrix multiplier includes a first multiplying unit a second multiplying unit, a memory load circuit, and an outer buffer circuit. The first multiplying unit includes a first inner buffer circuit and a second inner buffer circuit, and the second multiplying unit includes a first inner buffer circuit and a second inner buffer circuit. The memory load circuit is configured to load data from memory, in a single burst of a burst memory access mode, into the first inner buffer circuit of the first multiplying unit; and into the first inner buffer circuit of the second multiplying unit.

20 Claims, 18 Drawing Sheets

Related U.S. Application Data

(60) Provisional application No. 62/808,729, filed on Feb. 21, 2019.

(56) References Cited

U.S. PATENT DOCUMENTS

| | | |
|---|---|---|
| 8,078,661 B2 | 12/2011 | Mukaida et al. |
| 8,589,468 B2 | 11/2013 | Juffa et al. |
| 9,489,176 B2 | 11/2016 | Haugen |
| 10,073,815 B2 | 9/2018 | Zhou |
| 10,090,067 B1 | 10/2018 | Canepa et al. |
| 10,146,738 B2 | 12/2018 | Nurvitadhi et al. |
| 10,210,137 B2 | 2/2019 | Cohen et al. |
| 2007/0233769 A1 | 10/2007 | Moshier et al. |
| 2014/0032625 A1 | 1/2014 | McCarthy |
| 2014/0365548 A1 | 12/2014 | Mortensen |
| 2017/0168990 A1 | 6/2017 | Kernert et al. |
| 2018/0157465 A1 | 6/2018 | Bittner et al. |
| 2018/0189063 A1 | 7/2018 | Fleming et al. |
| 2018/0246853 A1 | 8/2018 | Fowers et al. |
| 2020/0133993 A1* | 4/2020 | Aga .................. G06F 15/8007 |

FOREIGN PATENT DOCUMENTS

| | | |
|---|---|---|
| JP | 2012-60666 A | 3/2012 |
| TW | 200739341 A | 10/2007 |
| TW | 201905914 A | 2/2019 |
| WO | 2018/126073 A1 | 7/2018 |

OTHER PUBLICATIONS

U.S. Notice of Allowance dated Jun. 14, 2022, issued in U.S. Appl. No. 16/407,064 (7 pages).

US Office Action dated Mar. 18, 2024, issued in U.S. Appl. No. 17/967,733 (21 pages).

Chinese Office Action dated Jul. 22, 2024, issued in Chinese Patent Application No. 202010104592.7, 8 pages.

* cited by examiner

Matrix A in Memory (Tile Size 12 x 8) (Data M = 12, K = 20) (LDA = K)

| Dim | 0 | 1 | 2 | 3 | 4 | 5 | 6 | 7 | 8 | 9 | 10 | 11 | 12 | 13 | 14 | 15 | 16 | 17 | 18 | 19 | | | | |
|---|---|---|---|---|---|---|---|---|---|---|---|---|---|---|---|---|---|---|---|---|---|---|---|---|
| Tile | 0 | | | | | | | | 1 | | | | | | | | 3 | | | | | | | |
| Word | 0 | 1 | 2 | 3 | 4 | 5 | 6 | 7 | 0 | 1 | 2 | 3 | 4 | 5 | 6 | 7 | 0 | 1 | 2 | 3 | 4 | 5 | 6 | 7 |
| 0 | 0 | 1 | 2 | 3 | 4 | 5 | 6 | 7 | 8 | 9 | 10 | 11 | 12 | 13 | 14 | 15 | 16 | 17 | 18 | 19 | | | | |
| 1 | 20 | 21 | 22 | 23 | 24 | 25 | 26 | 27 | 28 | 29 | 30 | 31 | 32 | 33 | 34 | 35 | 36 | 37 | 38 | 39 | | | | |
| 2 | 40 | 41 | 42 | 43 | 44 | 45 | 46 | 47 | 48 | 49 | 50 | 51 | 52 | 53 | 54 | 55 | 56 | 57 | 58 | 59 | | | | |
| 3 | 60 | 61 | 62 | 63 | 64 | 65 | 66 | 67 | 68 | 69 | 70 | 71 | 72 | 73 | 74 | 75 | 76 | 77 | 78 | 79 | | | | |
| 4 | 80 | 81 | 82 | 83 | 84 | 85 | 86 | 87 | 88 | 89 | 90 | 91 | 92 | 93 | 94 | 95 | 96 | 97 | 98 | 99 | | | | |
| 5 | 100 | 101 | 102 | 103 | 104 | 105 | 106 | 107 | 108 | 109 | 110 | 111 | 112 | 113 | 114 | 115 | 116 | 117 | 118 | 119 | | | | |
| 6 | 120 | 121 | 122 | 123 | 124 | 125 | 126 | 127 | 128 | 129 | 130 | 131 | 132 | 133 | 134 | 135 | 136 | 137 | 138 | 139 | | | | |
| 7 | 140 | 141 | 142 | 143 | 144 | 145 | 146 | 147 | 148 | 149 | 150 | 151 | 152 | 153 | 154 | 155 | 156 | 157 | 158 | 159 | | | | |
| 8 | 160 | 161 | 162 | 163 | 164 | 165 | 166 | 167 | 168 | 169 | 170 | 171 | 172 | 173 | 174 | 175 | 176 | 177 | 178 | 179 | | | | |
| 9 | 180 | 181 | 182 | 183 | 184 | 185 | 186 | 187 | 188 | 189 | 190 | 191 | 192 | 193 | 194 | 195 | 196 | 197 | 198 | 199 | | | | |
| 10 | 200 | 201 | 202 | 203 | 204 | 205 | 206 | 207 | 208 | 209 | 210 | 211 | 212 | 213 | 214 | 215 | 216 | 217 | 218 | 219 | | | | |
| 11 | 220 | 221 | 222 | 223 | 224 | 225 | 226 | 227 | 228 | 229 | 230 | 231 | 232 | 233 | 234 | 235 | 236 | 237 | 238 | 239 | | | | |

ADAPTIVE MATRIX MULTIPLICATION ACCELERATOR FOR MACHINE LEARNING AND DEEP LEARNING APPLICATIONS

CROSS-REFERENCE TO RELATED APPLICATION(S)

The present application is a continuation of U.S. patent application Ser. No. 16/407,064, filed May 8, 2019, entitled "ADAPTIVE MATRIX MULTIPLICATION ACCELERATOR FOR MACHINE LEARNING AND DEEP LEARNING APPLICATIONS", which claims priority to and the benefit of U.S. Provisional Application No. 62/808,729, filed Feb. 21, 2019, entitled "ADAPTIVE MATRIX MULTIPLICATION ACCELERATOR FOR ML/DL APPLICATIONS", the entire contents of both which are incorporated herein by reference.

FIELD

One or more aspects of embodiments according to the present disclosure relate to processing circuits, and more particularly to a circuit for multiplying matrices.

BACKGROUND

Machine learning applications, especially those that use deep neural networks, may involve a significant proportion of operations that are matrix multiplications. In some applications, matrix multiplication may consume the majority of the running time of an entire deep neural network. As such, a system for multiplying matrices efficiently may be helpful for improving the performance of a deep neural network.

SUMMARY

According to some embodiments there is provided a system, including a first multiplying unit; a second multiplying unit; a memory load circuit; and an outer buffer circuit, the first multiplying unit including a first inner buffer circuit and a second inner buffer circuit, the second multiplying unit including a first inner buffer circuit and a second inner buffer circuit, the memory load circuit being configured to load data from memory, in a single burst of a burst memory access mode, into: the first inner buffer circuit of the first multiplying unit; and the first inner buffer circuit of the second multiplying unit.

In some embodiments: the first multiplying unit includes an adder circuit, and the first multiplying unit is configured: to form a first product, of: a first element of the first inner buffer circuit of the first multiplying unit, and a first element of the second inner buffer circuit of the first multiplying unit; to transmit the first product to the adder circuit; to form a second product, of: a second element of the first inner buffer circuit of the first multiplying unit, and a second element of the second inner buffer circuit of the first multiplying unit; and to transmit the second product to the adder circuit.

In some embodiments, the first multiplying unit includes: a first multiplying circuit, configured to form the first product; and a second multiplying circuit, configured to form the second product.

In some embodiments, the adder circuit is configured: to form a first sum, of the first product and the second product, and to send the first sum to the outer buffer circuit.

In some embodiments: the second multiplying unit includes an adder circuit, and the second multiplying unit is configured: to form a third product, of: a first element of the first inner buffer circuit of the second multiplying unit, and a first element of the second inner buffer circuit of the second multiplying unit; to transmit the third product to the adder circuit of the second multiplying unit; to form a fourth product, of: a second element of the first inner buffer circuit of the second multiplying unit, and a second element of the second inner buffer circuit of the second multiplying unit; and to transmit the fourth product to the adder circuit of the second multiplying unit.

In some embodiments: the adder circuit of the second multiplying unit is configured: to form a second sum, of the third product and the fourth product, and to send the second sum to the outer buffer circuit, and the outer buffer circuit is configured to add the first sum and the second sum.

In some embodiments: the first multiplying unit includes an adder circuit; the first inner buffer circuit of the first multiplying unit includes a first mini-buffer and a second mini-buffer; the second inner buffer circuit of the first multiplying unit includes a first mini-buffer and a second mini-buffer; the first multiplying unit is configured: to form a first product, of: a first element of the first mini-buffer of the first inner buffer circuit of the first multiplying unit, and a first element of the first mini-buffer of the second inner buffer circuit of the first multiplying unit; to transmit the first product to the adder circuit; to form a second product, of: a first element of the second mini-buffer of the first inner buffer circuit of the first multiplying unit, and a first element of the second mini-buffer of the second inner buffer circuit of the first multiplying unit; and to transmit the second product to the adder circuit.

In some embodiments: the first multiplying unit is further configured: to form a third product, of: a second element of the first mini-buffer of the first inner buffer circuit of the first multiplying unit, and the first element of the first mini-buffer of the second inner buffer circuit of the first multiplying unit; to transmit the third product to the adder circuit; to form a fourth product, of: a second element of the second mini-buffer of the first inner buffer circuit of the first multiplying unit, and the first element of the second mini-buffer of the second inner buffer circuit of the first multiplying unit; and to transmit the fourth product to the adder circuit.

In some embodiments: the adder circuit is configured to form a first sum, of the first product and the second product, and to send the first sum to the outer buffer circuit; and the outer buffer circuit is configured to store the first sum in a first element of the outer buffer circuit.

In some embodiments: the adder circuit is further configured to form a second sum, of the third product and the fourth product, and to send the second sum to the outer buffer circuit; and the outer buffer circuit is configured to store the second sum in a second element of the outer buffer circuit.

In some embodiments: the first multiplying unit includes an adder circuit; and the first multiplying unit is configured: to form a first product, of: a first element of the first inner buffer circuit of the first multiplying unit, and a first element of the outer buffer circuit of the first multiplying unit; to transmit the first product to the adder circuit; to form a second product, of: a second element of the first inner buffer circuit of the first multiplying unit, and a second element of the outer buffer circuit of the first multiplying unit; and to transmit the second product to the adder circuit.

In some embodiments, the adder circuit is configured: to form a first sum, of the first product and the second product; and to store the first sum in a first element of the second inner buffer circuit.

In some embodiments, the first multiplying unit includes: a first multiplying circuit, configured to form the first product; and a second multiplying circuit, configured to form the second product.

In some embodiments, the system includes a first entity and a second entity, the first entity including the first multiplying unit, and the second multiplying unit.

In some embodiments, the memory load circuit is configured to receive read requests from the first entity and read requests from the second entity, and to arbitrate the read requests.

In some embodiments, the memory load circuit is configured to load a portion of a matrix from memory into the second inner buffer circuit of the first multiplying unit, in a manner that transposes the elements of the portion of the matrix.

According to some embodiments there is provided a system, including a first multiplying unit; a second multiplying unit; a memory load circuit; a memory store circuit; and an outer buffer circuit, the first multiplying unit including: a multiplying circuit; a first inner buffer circuit; a second inner buffer circuit; a multiplying circuit input multiplexer having a common port connected to an input of the multiplying circuit; a multiplying circuit output multiplexer having a common port connected to an output of the multiplying circuit; and a second inner buffer circuit output multiplexer, having a common port connected to an output of the second inner buffer circuit.

In some embodiments, in a first state of the first multiplying unit, the multiplying circuit input multiplexer is configured to route data from the second inner buffer circuit output multiplexer to a first input of the multiplying circuit; the multiplying circuit output multiplexer is configured to route data from the output of the multiplying circuit to the outer buffer circuit; and the second inner buffer circuit output multiplexer is configured to route data from the second inner buffer circuit to the multiplying circuit input multiplexer.

In some embodiments, in a second state of the first multiplying unit, the multiplying circuit input multiplexer is configured to route data from the outer buffer circuit to the first input of the multiplying circuit; the multiplying circuit output multiplexer is configured to route data from the output of the multiplying circuit to the second inner buffer circuit; and the second inner buffer circuit output multiplexer is configured to route data from the second inner buffer circuit to the memory store circuit.

According to some embodiments there is provided a system, including a first multiplying unit; a second multiplying unit; means for loading data from memory; and an outer buffer circuit, the first multiplying unit including a first inner buffer circuit and a second inner buffer circuit, the second multiplying unit including a first inner buffer circuit and a second inner buffer circuit, the means for loading data from memory being configured to load data from memory, in a single burst of a burst memory access mode, into: the first inner buffer circuit of the first multiplying unit; and the first inner buffer circuit of the second multiplying unit.

According to some embodiments, there is provided a method for performing multiplications, the method including: in response to a first register of a processing circuit storing a first value, calculating a matrix product of a first matrix and a second matrix, the first matrix being the first factor in the matrix product, and the second matrix being the second factor in the matrix product; in response to the first register storing a second value, calculating a matrix product of a transpose of the first matrix and the second matrix, the transpose of the first matrix being the first factor in the matrix product, and the second matrix being the second factor in the matrix product; in response to the first register storing a third value, calculating a matrix product of the first matrix and a transpose of the second matrix, the first matrix being the first factor in the matrix product, and the transpose of the second matrix being the second factor in the matrix product; in response to the first register storing a fourth value, calculating a matrix product of the transpose of the first matrix and the transpose of the second matrix, the transpose of the first matrix being the first factor in the matrix product, and the transpose of the second matrix being the second factor in the matrix product; and in response to the first register storing a fifth value, calculating a matrix product of the first matrix and a vector, the first matrix being the first factor in the matrix product, and the vector being the second factor in the matrix product.

According to some embodiments, there is provided a method for performing multiplications, the method including: calculating a matrix product of a first matrix stored in a first abstract buffer and a second matrix stored in a second abstract buffer; and storing the matrix product in a third abstract buffer, wherein: in response to a second register having a fourth value: the first abstract buffer is mapped to a first physical buffer, the second abstract buffer is mapped to a second physical buffer, and the third abstract buffer is mapped to a third physical buffer; and in response to the second register having a fifth value: the first abstract buffer is mapped to the first physical buffer, the second abstract buffer is mapped to the third physical buffer, and the third abstract buffer is mapped to the second physical buffer.

In some embodiments, the method further includes storing, in the second register, the fourth value or the fifth value, based on dimensions of matrices to be multiplied.

According to some embodiments, there is provided a method for performing multiplications, the method including: reading a portion of a first matrix from memory in burst mode, into a first buffer in a first unit in a processing circuit and into a first buffer in a second unit in the processing circuit; reading a portion of a second matrix from memory into a second buffer in the first unit in a processing circuit and into a second buffer in the second unit; and calculating a matrix product of elements stored in the first buffer in the first unit and elements stored in the first buffer in the second unit.

In some embodiments, the first unit is in a first entity in the processing circuit, and the second unit is in a second entity in the processing circuit.

BRIEF DESCRIPTION OF THE DRAWINGS

These and other features and advantages of the present disclosure will be appreciated and understood with reference to the specification, claims, and appended drawings wherein:

FIG. 5A is a data arrangement diagram, according to an embodiment of the present disclosure;

FIG. 6A is a data arrangement diagram, according to an embodiment of the present disclosure;

FIG. 6B is a data arrangement diagram, according to an embodiment of the present disclosure;

FIG. 8A is a data arrangement diagram, according to an embodiment of the present disclosure;

FIG. 8B is a data arrangement diagram, according to an embodiment of the present disclosure;

DETAILED DESCRIPTION

The detailed description set forth below in connection with the appended drawings is intended as a description of exemplary embodiments of an adaptive matrix multiplier provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1A:
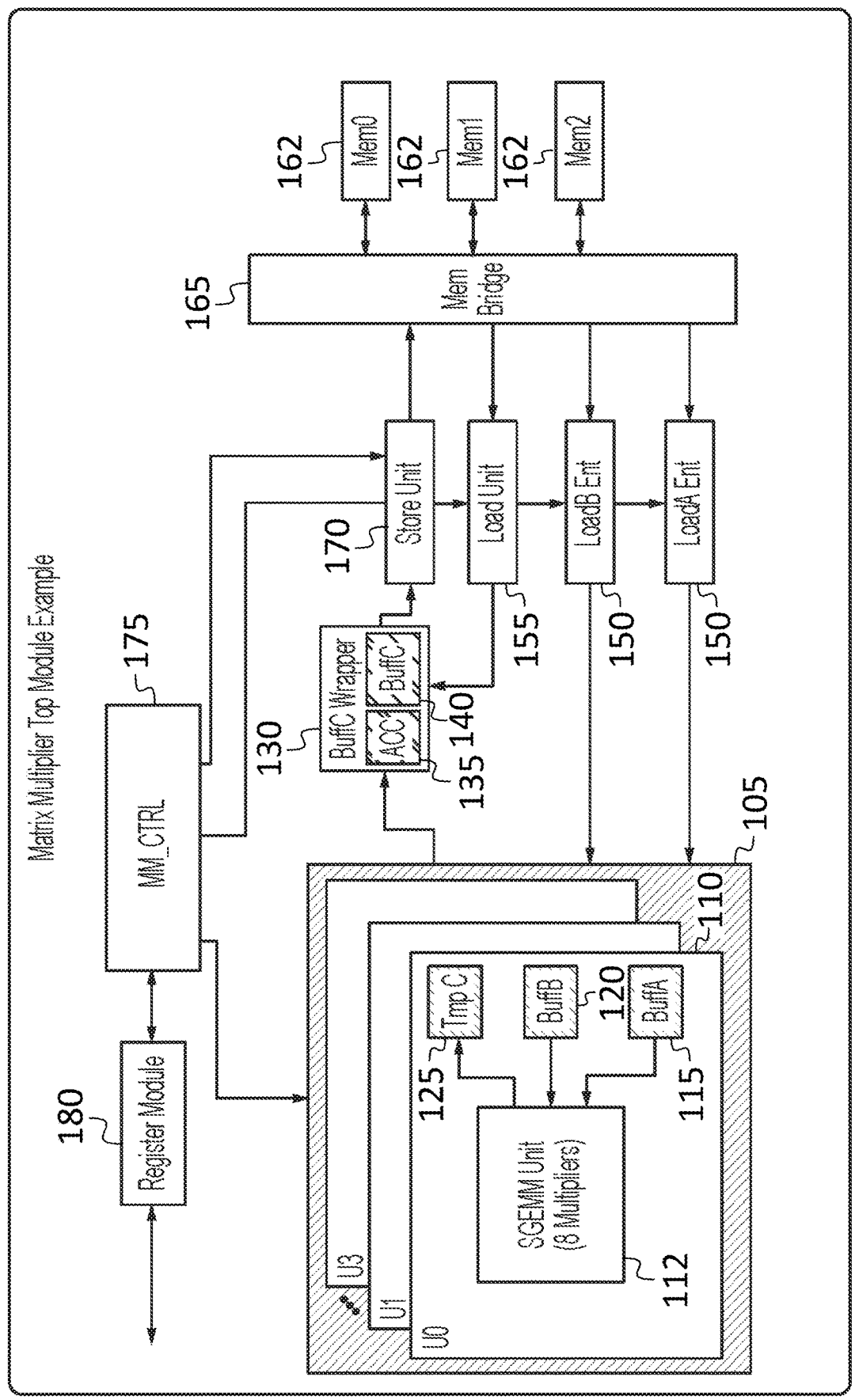
FIG. 1A is a block diagram of a circuit for matrix multiplication, according to an embodiment of the present disclosure.
Figure 4A:
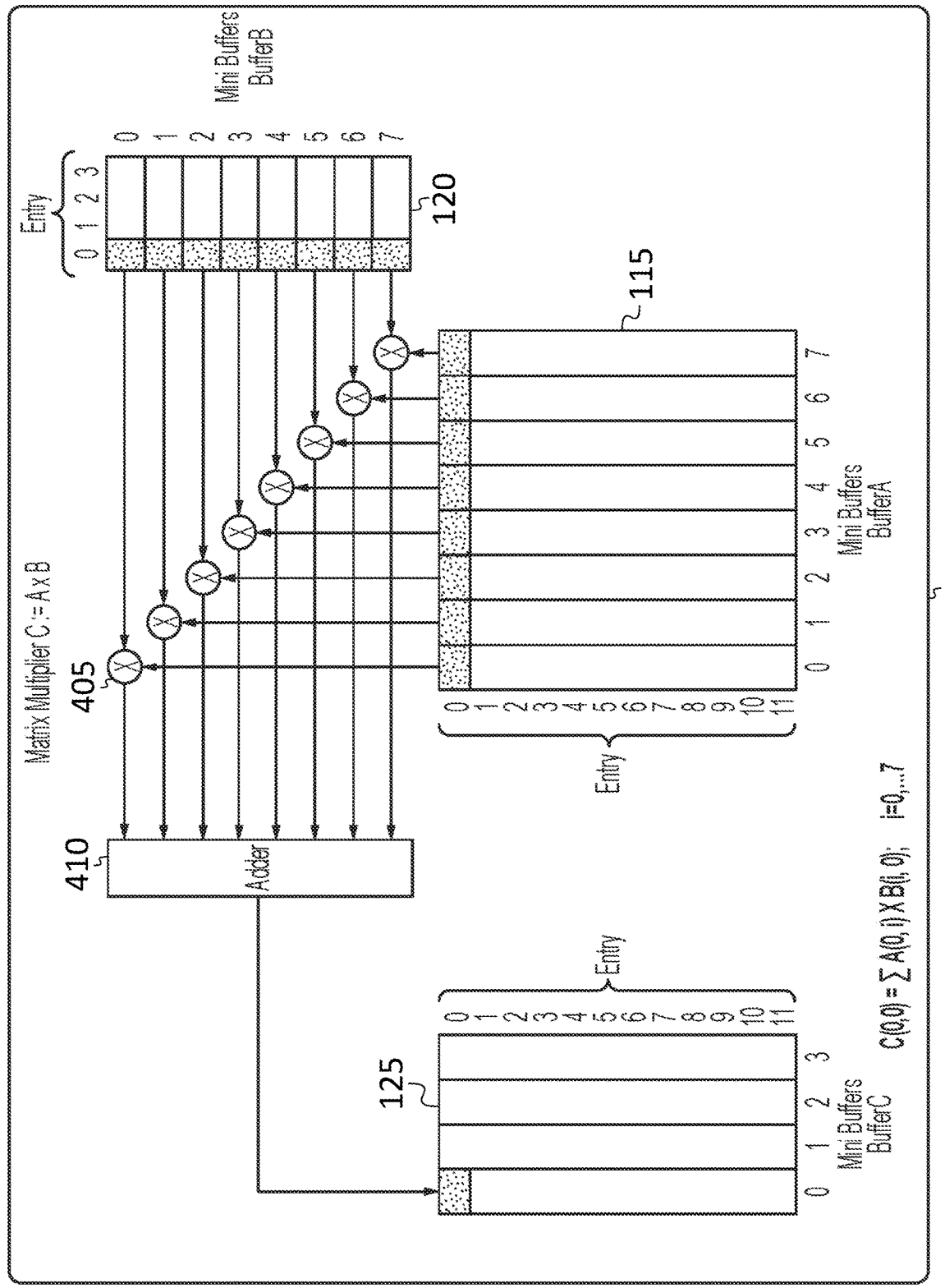
FIG. 4A is a block diagram of a portion of a circuit for matrix multiplication, according to an embodiment of the present disclosure.
Figure 4B:
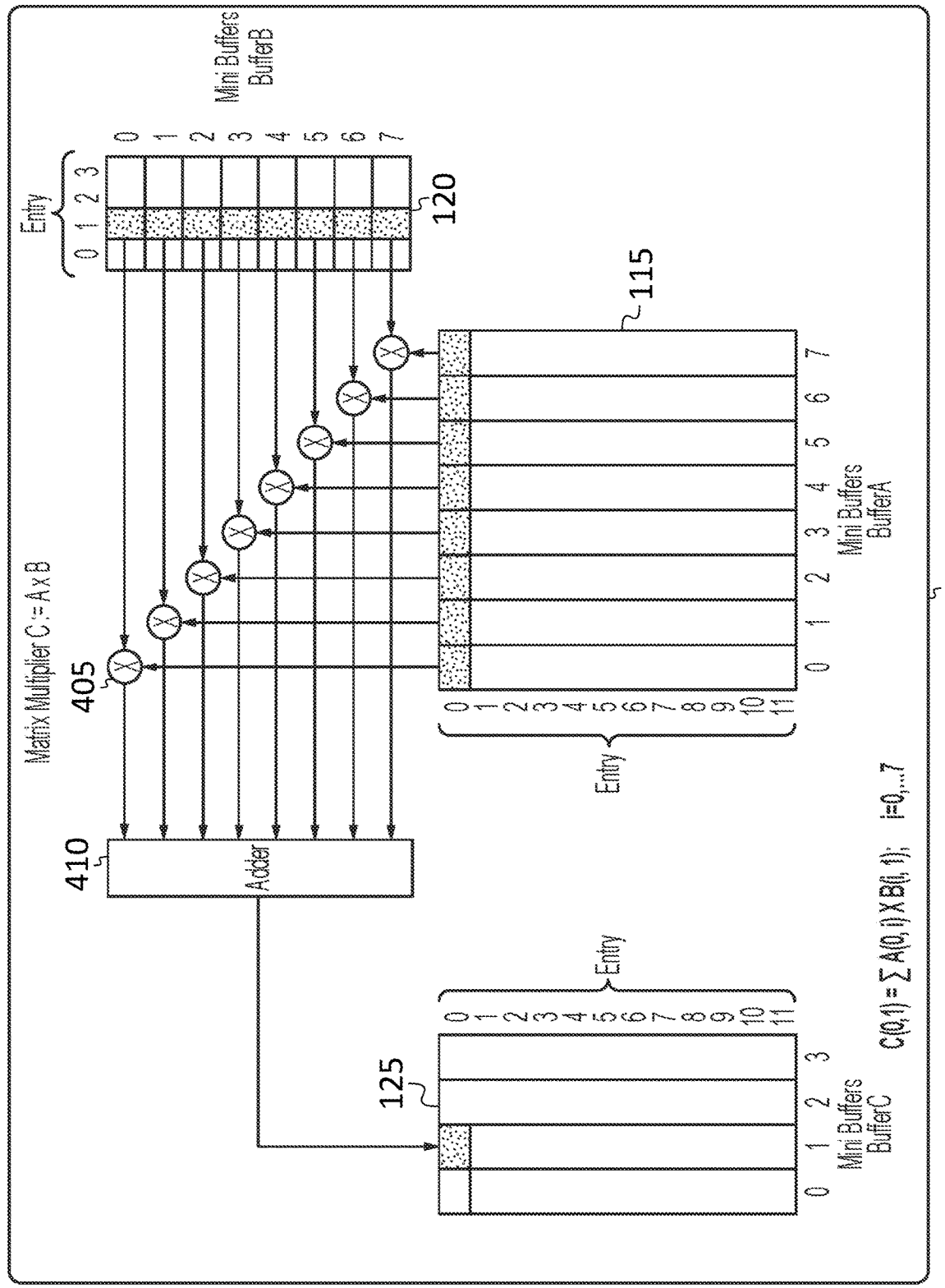
FIG. 4B is a block diagram of a portion of a circuit for matrix multiplication, according to an embodiment of the present disclosure.
Figure 4C:
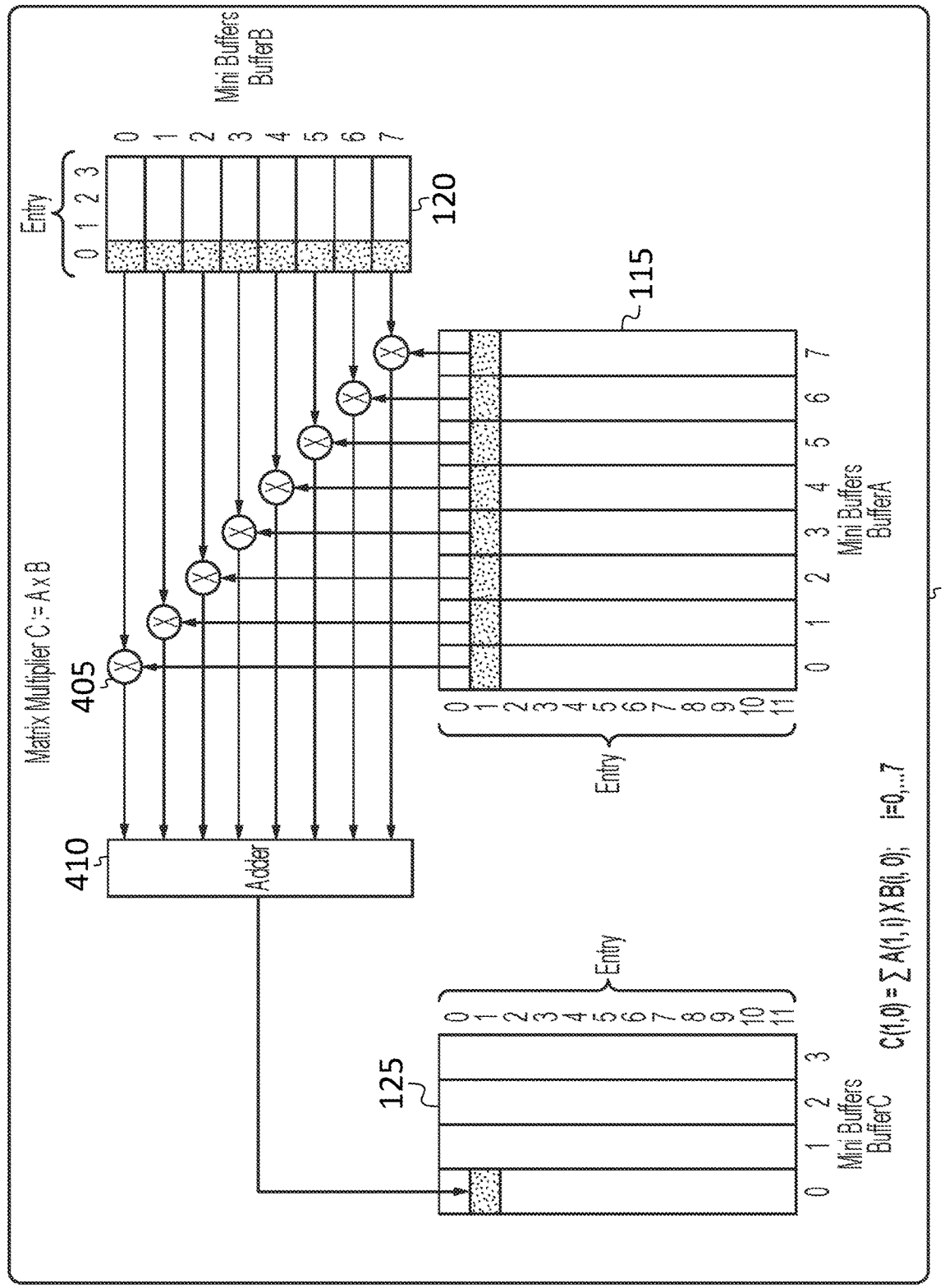
FIG. 4C is a block diagram of a portion of a circuit for matrix multiplication, according to an embodiment of the present disclosure.

FIG. 1A shows an example of an adaptive matrix multiplier, according to some embodiments. The adaptive matrix multiplier of FIG. 1 includes one entity 105 including four multiplying units 110 (labeled U0 through U3). Entities 105 are discussed in further detail below. Each of the multiplying units 110 includes an array 112 of (e.g., eight) multipliers, or "multiplying circuits" 405 (FIGS. 4A-4C). Each of the multiplying units 110 further includes a first inner buffer circuit 115, a second inner buffer circuit 120, and a temporary inner buffer circuit 125. Each of the multiplying units 110 may operate on (e.g., process) computational units that may be referred to as "data words". Depending on the application, a data word may be an 8-bit integer (INT8), a 16-bit integer (INT16), a 32-bit integer (INT32), a 16-bit floating point (FP16), or a 32-bit floating point (FP32).

Some embodiments may be employed to perform matrix multiplications, or multiplications of matrices with vectors. In some embodiments the multiplication process may be controlled, at least in part, by values stored in one or more registers (e.g., in the register module 180, discussed in further detail below). It will be understood that matrix multiplication is not commutative, so that, for example, in general the matrix product A×B is not equal to the matrix product B×A. Some embodiments are capable of performing various multiplications under the control of the one or more registers, including calculating the product of two matrices, calculating a product of one matrix and the transpose of the other, the product of the transposes of two matrices, or the product of a matrix and a vector, as described in further detail below.

The temporary inner buffer circuit 125 is connected to an outer buffer circuit 130, which includes an accumulator 135 and a buffer (e.g., an array of registers) 140. The adaptive matrix multiplier may include a first load entity module (or "memory load circuit") 150 for the first inner buffer circuit 115, a second load entity module 150 for the second inner buffer circuit 120 and a load unit (or "load circuit") 155 for the outer buffer circuit 130. The load entity modules 150 and the load unit 155 may communicate with one or more memories 162 through a memory bridge 165. In some embodiments, the load entity modules 150 perform read operations from the memories 162 in burst mode, i.e., a plurality of data words may be returned by the memories in response to a single read command being sent to the memories. Operation in burst mode may result in significantly higher data throughput than operation in a mode in which any one of the memories 162 sends only one data word in response to a read command. A memory store circuit 170 may also communicate with the one or more memories 162 through the memory bridge 165, and may store the results of calculations in the memories 162.

A control circuit 175 may control the operation of the other circuits in the adaptive matrix multiplier; it may receive commands from a host (and return status information to the host) through a register module 180.

Each of the first inner buffer circuit 115 and the second inner buffer circuit 120 may include an array of mini-buffers, e.g., one mini-buffer for each of the multiplying circuits in the array 112 of multiplying circuits. Each array of mini-buffers may be conceptually considered to form a matrix of elements, each column of the matrix corresponding to one of the mini-buffers, and each row corresponding to a set of elements, one from each mini-buffer, all of the elements corresponding to the row being at the same location in a respective mini-buffer. For example, a first row may correspond to the first element of each mini-buffer.

In operation, the array 112 of multiplying circuits may form dot products of the rows of the mini-buffers. As used herein, a "dot product" of two vectors of equal length (e.g., of a row of one matrix with a column of another matrix) means the sum of the element-wise products of the elements of the vectors. The array 112 of multiplying circuits may form, for example, a dot product of (i) the first row of the array of mini-buffers of the first inner buffer circuit 115 with (ii) the first row of the array of mini-buffers of the second inner buffer circuit 120, and then form a dot product of (i) the second row of the array of mini-buffers of the first inner buffer circuit 115 with (ii) the first row of the array of mini-buffers of the second inner buffer circuit 120. The use of such operations to perform matrix multiplication is discussed in greater detail below.

Figure 1B:
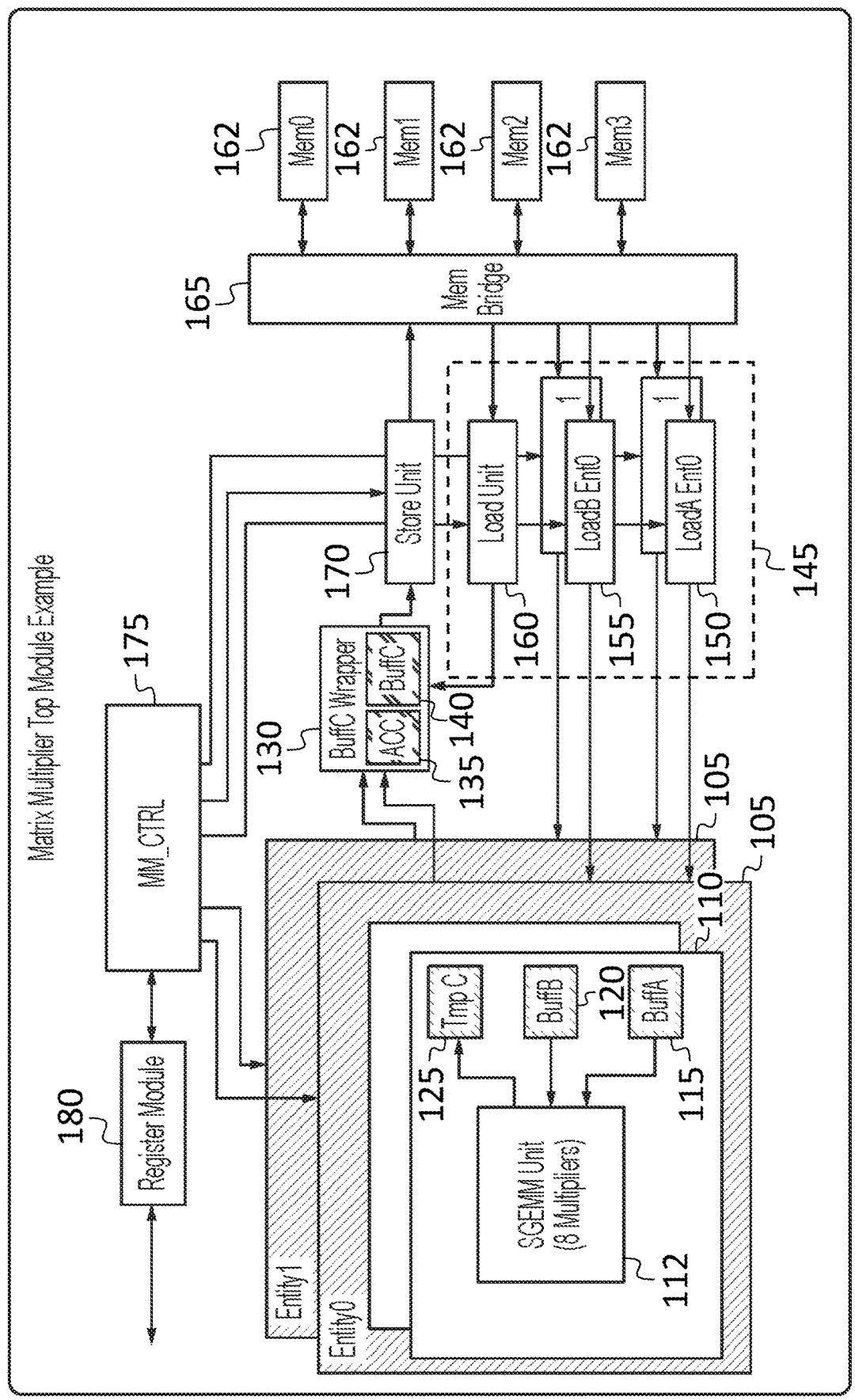
FIG. 1B is a block diagram of a circuit for matrix multiplication, according to an embodiment of the present disclosure.

FIG. 1B shows an example of an adaptive matrix multiplier with two entities 105, each having two multiplying units 110. The selection of the number of entities 105 included in the adaptive matrix multiplier, and the number of multiplying units 110 per entity 105 may be made based on the application for which the adaptive matrix multiplier is intended, and based on hardware resources. The number of entities 105 included in the adaptive matrix multiplier, and the number of multiplying units 110 per entity 105 may be selected at design time, or at system startup, or it may be changed in real time, during operation. In some embodiments, data from the memories 162 are sent to the multiplying units 110 on a data bus having a width (e.g., 128 bits). The number of mini-buffers of the unit may be selected based on (e.g., to be equal to) the ratio of the width of the data bus to the width of the data word. The number of units per entity may be selected based on (e.g., to be equal to) memory bus bandwidth/speed vs the cycles required by the computation (multiplication), and fine-tuned by other micro-architecture factors. The granularity of memory access operations is a rectangular, square, or one dimensional array that may be referred to as a "tile". The tile may be parameterized as "R_TW×C_TW", where R_TW is the tile row width with a value in the range 1, 2, 4, . . . , $2^r$, where r is a positive integer (i.e., the tile row width may be 1, 2, . . . , or other number equal to 2 to the power of r) and C_TW is the tile column width with a value in the range 1, 2, 4, . . . , $2^c$ (i.e., the tile column width may be 1, 2, . . . , or other number equal to 2 to the power of c). Each tile contains multiple words. The size may be selected based on requirements of the application for which the adaptive matrix multiplier is intended. Each tile, after being fetched from memory, may be stored in on-chip storage, such as in the first inner buffer circuit 115 or the second inner buffer circuit 120, or a FIFO or registers, based on requirements of the application for which the adaptive matrix multiplier is intended and based on implementation requirements.

Using matrix multiplication as an example, the product of two tiles, A, and B, may be calculated and may form a third tile C:

$$C(i,j)=\Sigma_p A(i,p)*B(p,j); \text{ where } i=0, \ldots, M;$$
$$j=0, \ldots, N; p=0, \ldots, K$$

The memory tiles A and B may be loaded into the first inner buffer circuit 115 and the second inner buffer circuit 120. The product C may be stored in the temporary inner buffer circuit 125, if needed, before being sent back to the memories 162 in the form of tile C.

Figure 2:
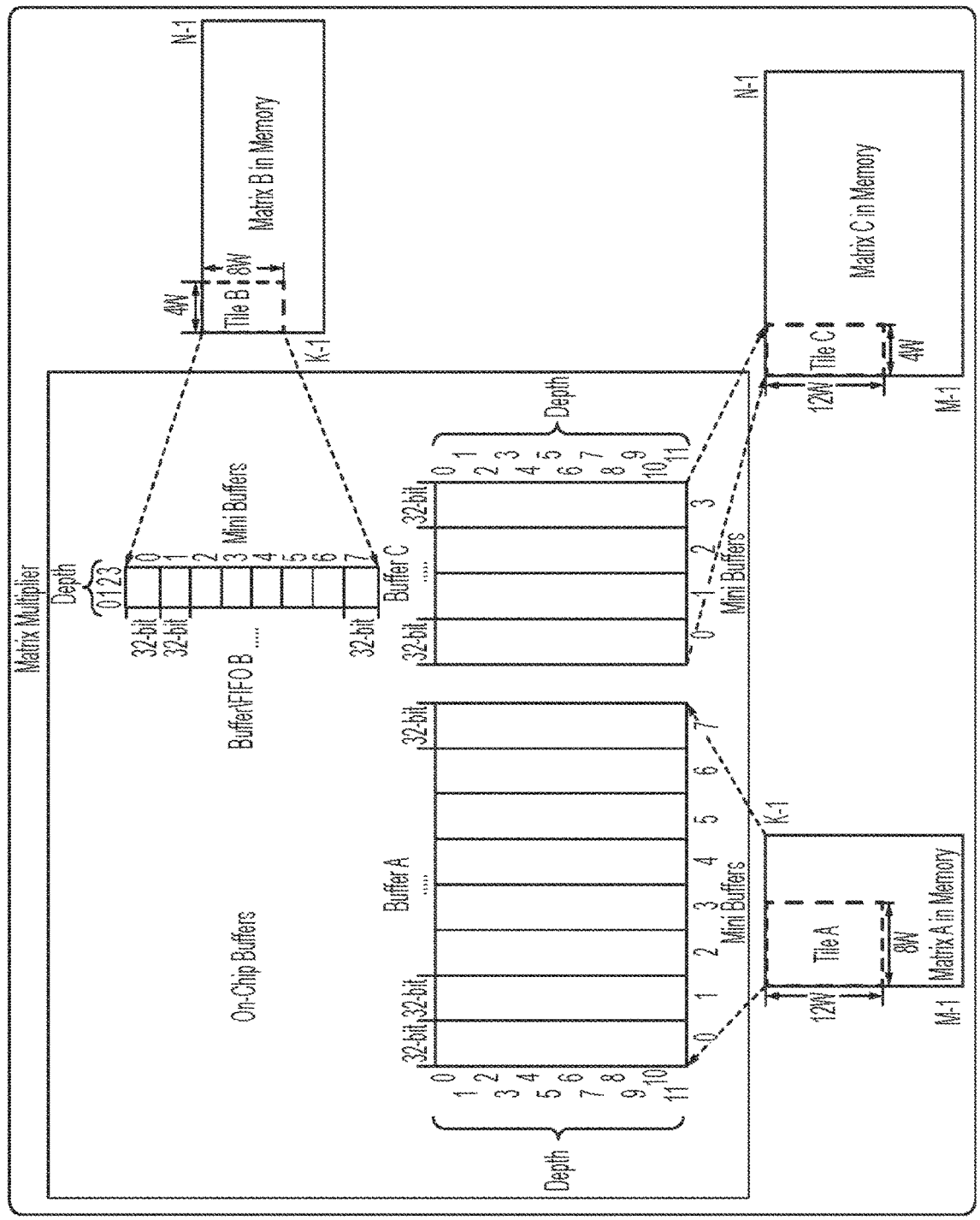
FIG. 2 is a matrix dimensions diagram, according to an embodiment of the present disclosure.

FIG. 2 illustrates an example of two matrices being fetched into two on-chip buffers (e.g., into the first inner buffer circuit 115 and the second inner buffer circuit 120), and their product being written back to memory, As an example, in some embodiments. The size of a first tile, "Tile A", is R_TW×C_TW=12×8 words, the size of a second tile, "Tile B", is R_TW×C_TW=8×4 words, and the size of a third tile, "Tile C", is R_TW×C_TW=12×4 words.

The first inner buffer circuit 115 and the second inner buffer circuit 120 may have the storage capacities shown in FIG. 2, denoted "Entry×Width" where Width is the number of mini-buffers in the buffer circuit and Entry, or Depth, is the number of entries each mini-buffer is capable of storing. In the example of FIG. 2, for the first inner buffer circuit 115, Entry×Width is 12 entries×8 mini-buffers, for the second inner buffer circuit 120, Entry×Width is 4 entries×8 mini-buffers, and for the outer buffer circuit 130, Entry×Width is 12 entries×4 mini-buffers. The Mini-buffer width is 1 word, which is 32 bits wide here as an example. To process the multiplications of C(i, j)=$\Sigma_p$A(i, p)*B(p, j) in parallel, the second inner buffer circuit 120 may be loaded from the Tile B region of memory in the "transposed" form, and filled up before starting the multiplication. In some neural network applications, the matrix A may be large and constant or rarely changing and the matrix B may be significantly smaller, and may change frequently. Latency with respect to the matrix B may be an important measure of performance, as such, a second inner buffer circuit 120 having a large number of entries in each mini-buffer may be of little use, because making use of a large number of entries may result in high latency. In such a system, the number of entries in each mini-buffer of the second inner buffer circuit 120 may be significantly smaller (e.g., a factor of between 2 and 8 smaller (e.g, a factor of 3 smaller)) than the number of entries in each mini-buffer of the first inner buffer circuit 115.

In some embodiments, each on-chip "Buffer" may be a buffer, FIFO or registers, depending on the requirements of the application for which the adaptive matrix multiplier is intended, and on the micro-architecture requirements.

Figure 3A:
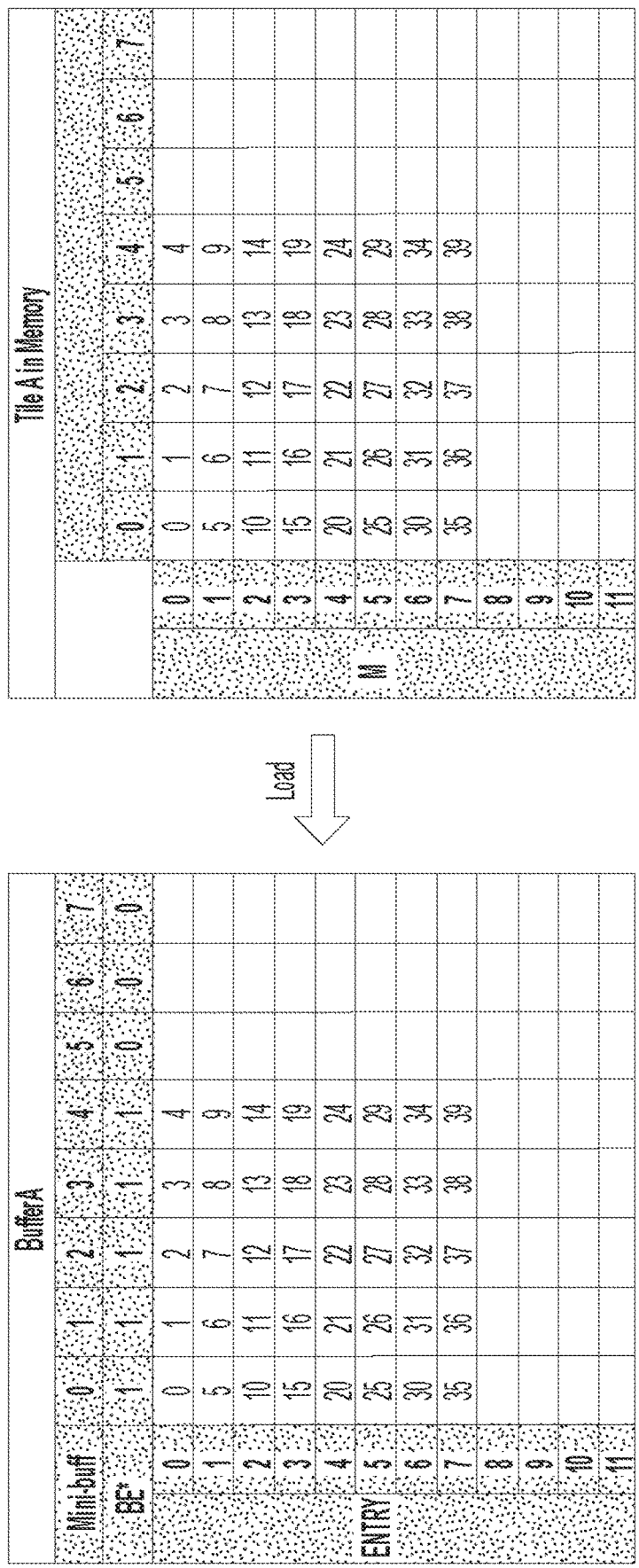
FIG. 3A is a data arrangement diagram, according to an embodiment of the present disclosure.
Figure 3B:
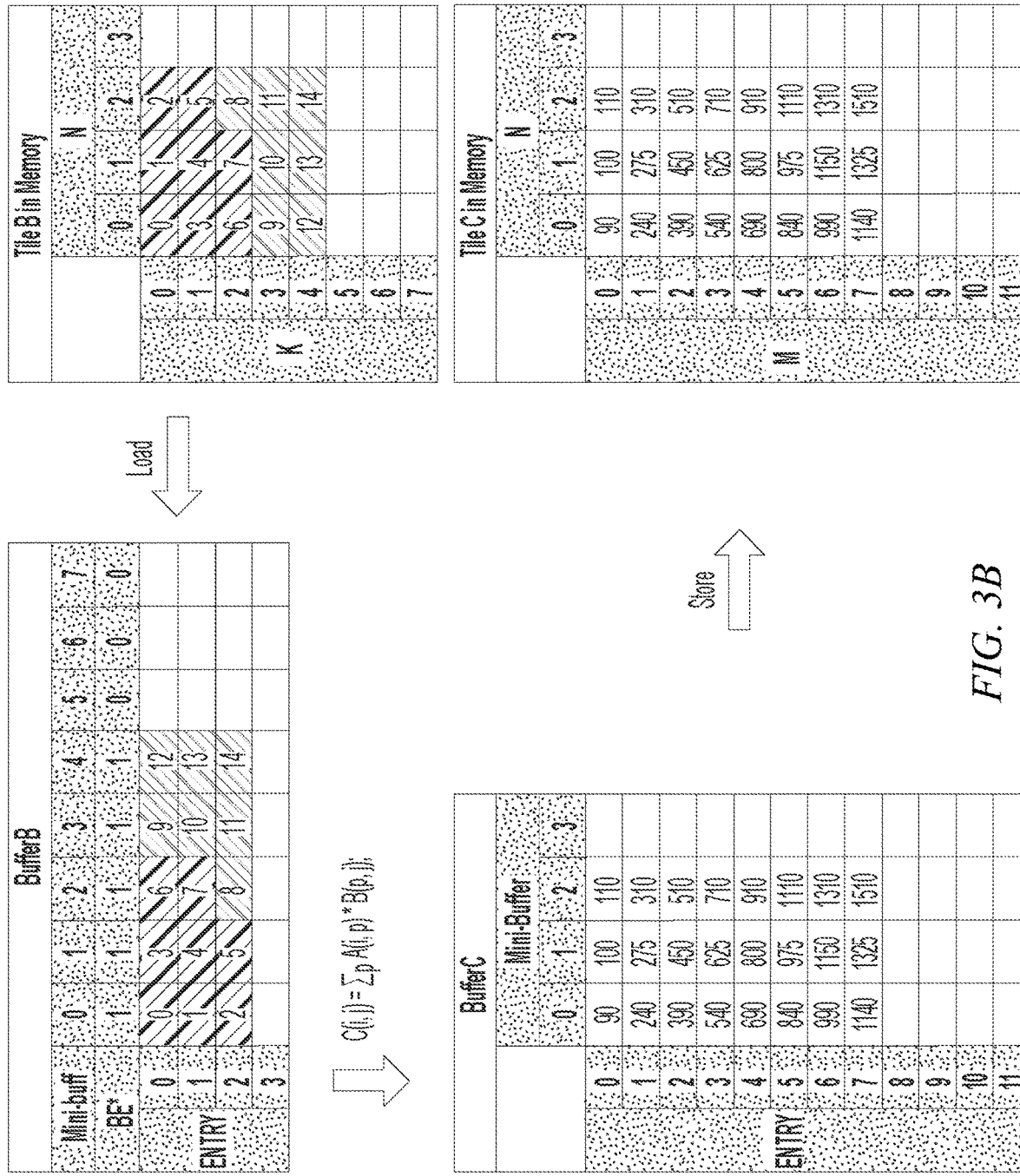
FIG. 3B is a data arrangement diagram, according to an embodiment of the present disclosure.

Referring to FIGS. 3A and 3B, as an example, the load entity modules 150 and the load unit 155 may load one matrix tile at a time from memory to an on-chip buffer, performing matrix transposing if needed, as discussed in further detail below. In some embodiments, the basic functions of Load Unit and Load Entity are similar. Load Unit may fill one buffer (with 8 mini-buffers, as and example); while Load Entity may fill multiple buffers at same time when the data from memory is a burst transaction. The memory store circuit 170 stores the contents of the outer buffer circuit 130 to the Tile C region of memory. In some embodiments, transposing of results written back to memory is not necessary. Moreover, padding of tile data is not needed, when a tile does not fill the on-chip buffer into which it is read, because the load entity modules 150 and the load unit 155 may handle a partial tile by disabling the buffer enable (BE) (e.g., setting the BE bit to zero) for the unused mini-buffers. Similarly, the memory store circuit 170 may handle a partial tile by setting the "word enable" when storing the mini-buffer data into the memory. In FIGS. 3A and 3B, the size of Tile A is 12×8 words, the size of Tile B is 8×4 words, and the size of Tile C is 12×4 (as in FIG. 2). In the example illustrated in FIGS. 3A and 3B, the sizes of the tiles (with the meaning of the dimensions M, N, and K being as shown in FIG. 2) are M_TW=12, N_TW=4 and K_W=8, and the data sizes are M=8, N=3, and K=5.

For example, a first dot product, of the first row of Buffer A and the first row of Buffer B (the first dot product having the value 90) may be calculated first, and stored in a first entry of Buffer C. A second dot product, of the first row of Buffer A and the second row of Buffer B (the second dot product having the value 100) may be calculated second, and stored in a second entry of Buffer C. In other embodiments, the dot product of the second row of Buffer A and the first row of Buffer B may instead be calculated second.

An example of multiplication C(0,0)=$\Sigma_i$A(0, i)×B(i, 0) is illustrated in FIG. 4A. As mentioned above, each multiplying unit 110 may include an array of multipliers (or "multiplying circuits" 405), e.g., FP32 multipliers running in parallel, and an adder (or "adder circuit") 410. The first inner buffer circuit 115 may include an array of mini-buffers (e.g., 8 mini-buffers) (with 12 entries each) and the second inner buffer circuit 120 may also include an array of mini-buffers (e.g., 8 mini-buffers) (with 4 entries each). In the example of FIG. 4A, the outer buffer circuit 130 has four mini-buffers, with 12 entries each. FIGS. 4B and 4C illustrate the multiplications of C(0,1)=$\Sigma_i$A(0, i)×B(i, 1) and C(1,0)=$\Sigma_i$ A(1, i)×B(i, 0) respectively.

Each of the load entity modules 150 may fetch multiple matrix tiles from memory as a burst transaction, perform matrix transposing operations as appropriate (as discussed in further detail below), and fill the associated on-chip buffers for the entity 105.

Figure 5B:
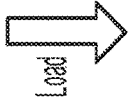
FIG. 5B is a data arrangement diagram, according to an embodiment of the present disclosure.

FIGS. 5A and 5B show the loading of a matrix ("Matrix A") from memory, in tile bursts, into the three first inner buffer circuits 115 of three of the multiplying units 110 of an entity 105 with four multiplying units 110. The matrix data are loaded into the three first inner buffer circuits 115 in a striping manner, at the same time, as shown.

Figure 6A:
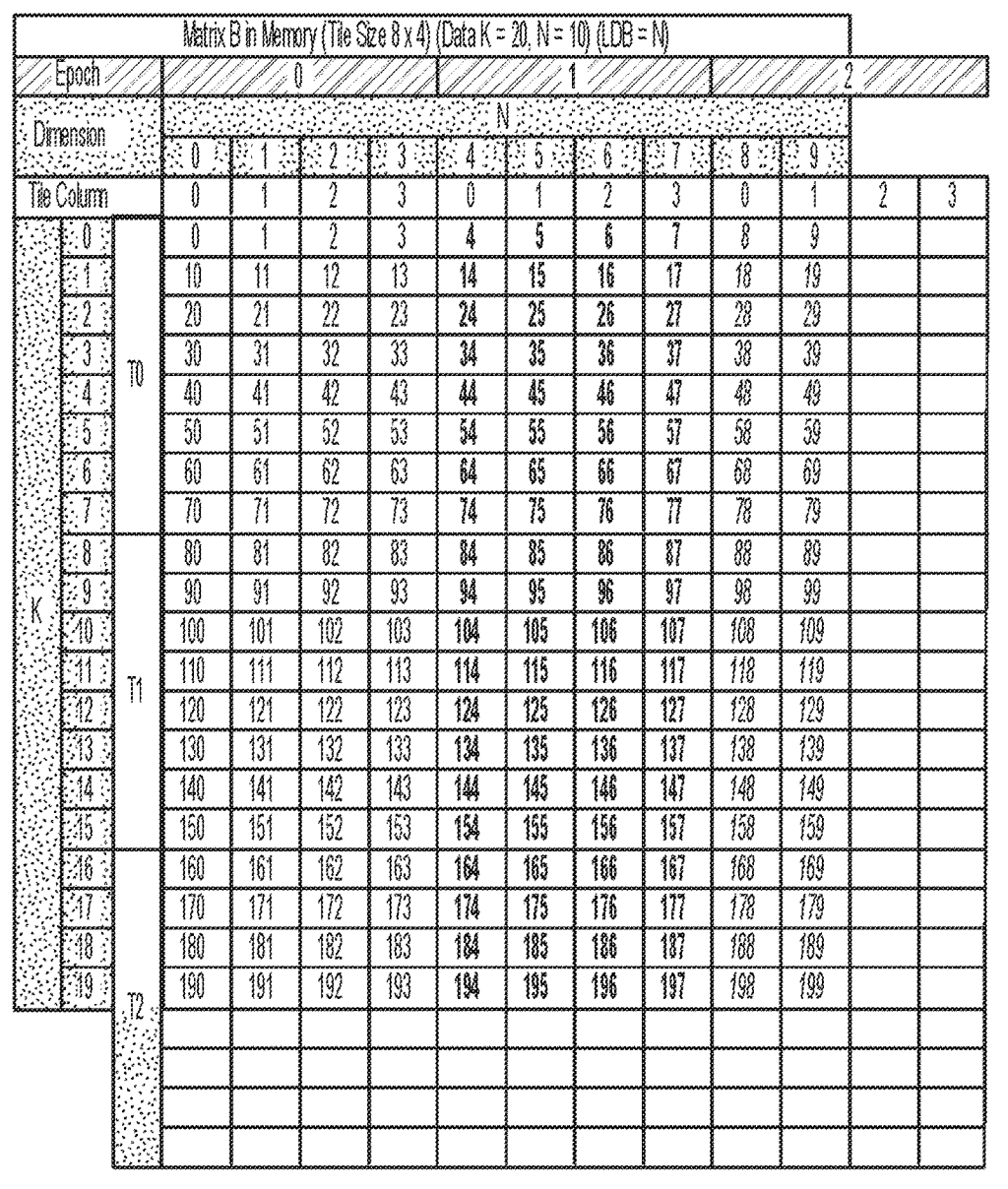
Figure 6B:
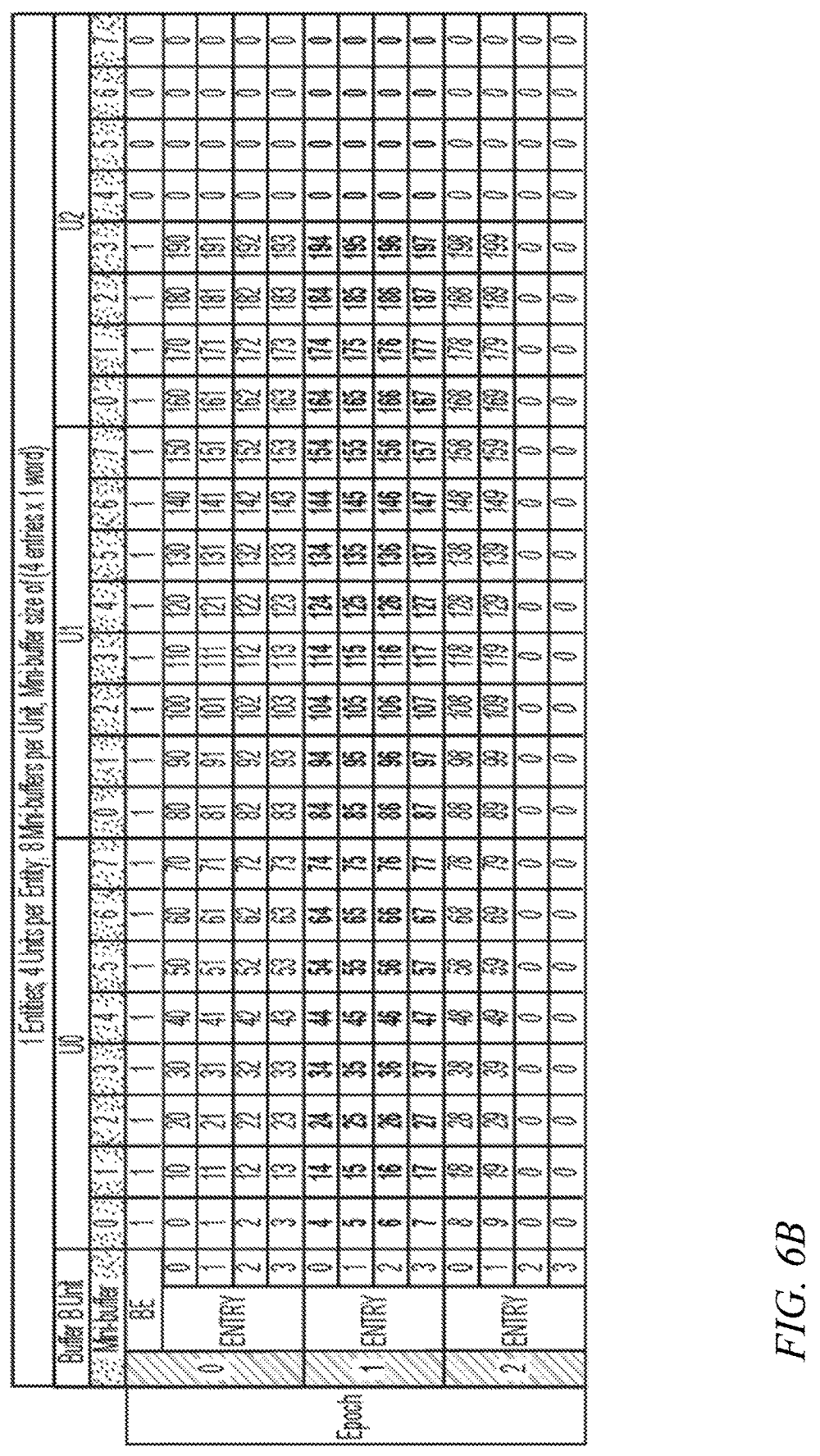

FIGS. 6A and 6B show the loading of a matrix ("Matrix B") from memory (FIG. 6A) into the three second inner buffer circuits 120 of three of the multiplying units 110 of an entity 105 with four multiplying units 110. Matrix B Tiles are fetched from memory individually, since Matrix B is stored in memory "normally" (i.e., not transposed) with LDB=N (where LDB=N refers to loading B memory in the N dimension, as illustrated, for example in FIG. 6A) in this example. The three second inner buffer circuits 120 may run in parallel (e.g., be fed into respective multiplying circuits 405 in parallel) after the entire matrix is loaded, (No, they could be filled in parallel or one by one, but run in parallel since they have been with data needed. No point to run one by one). The "Epoch" labeled in FIGS. 6A and 6B is the outer loop number. It should be noted that FIGS. 1-6 are examples of one of the options. They are only examples to explain how a matrix multiplier works, in some embodiments, and should not be understood to limit the present disclosure. For example, the numbers of elements (e.g., the number of entities 105 and the number of multiplying unit 110) are examples only and may, as one of skill in the art would understand, be different in different embodiments. The operating epoch (outer loop) is also shown in FIG. 7.

Figure 7:
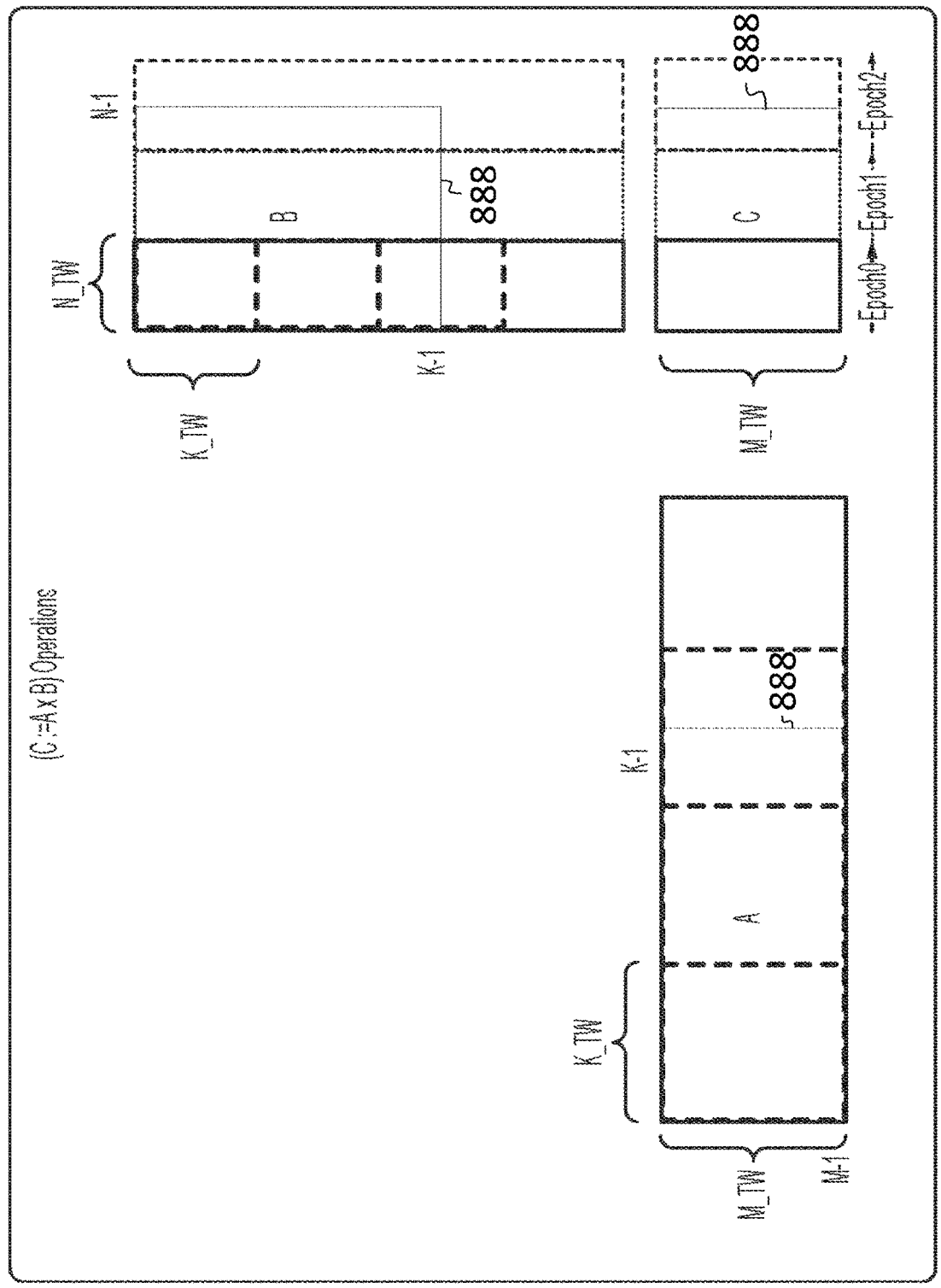
FIG. 7 is a data arrangement diagram, according to an embodiment of the present disclosure.

FIG. 7 shows an example of how a first matrix (A) may be stored in the three first inner buffer circuits 115 of three of the multiplying units 110 of an entity 105 with four multiplying units 110, and how portions of a second matrix (B) may be stored in the three second inner buffer circuits 120 of three of the multiplying units 110 of an entity 105 with four multiplying units 110. Products may be formed over three epochs, with a new portion of the second matrix (B) being loaded into the three second inner buffer circuits 120 in each epoch. In the example of FIG. 7, there is one entity, having four multiplying units 110, eight mini-buffers in each of the first inner buffer circuits 115, and eight mini-buffers in each of the second inner buffer circuits 120. Tile sizes are: M_TW=12; N_TW=4; and K_TW=8; and data sizes are M=12; N=10; and K=20. There is one inner loop in the K dimension and one middle loop in the M dimension; these inner loops run in parallel, and three epochs (outer loops) are used to complete the matrix multiplication computation of $C(i, j)=\Sigma p\ A(i, p)*B(p, j)$ shown in FIGS. 6A and 6B, and in FIG. 7.

Figure 8A:
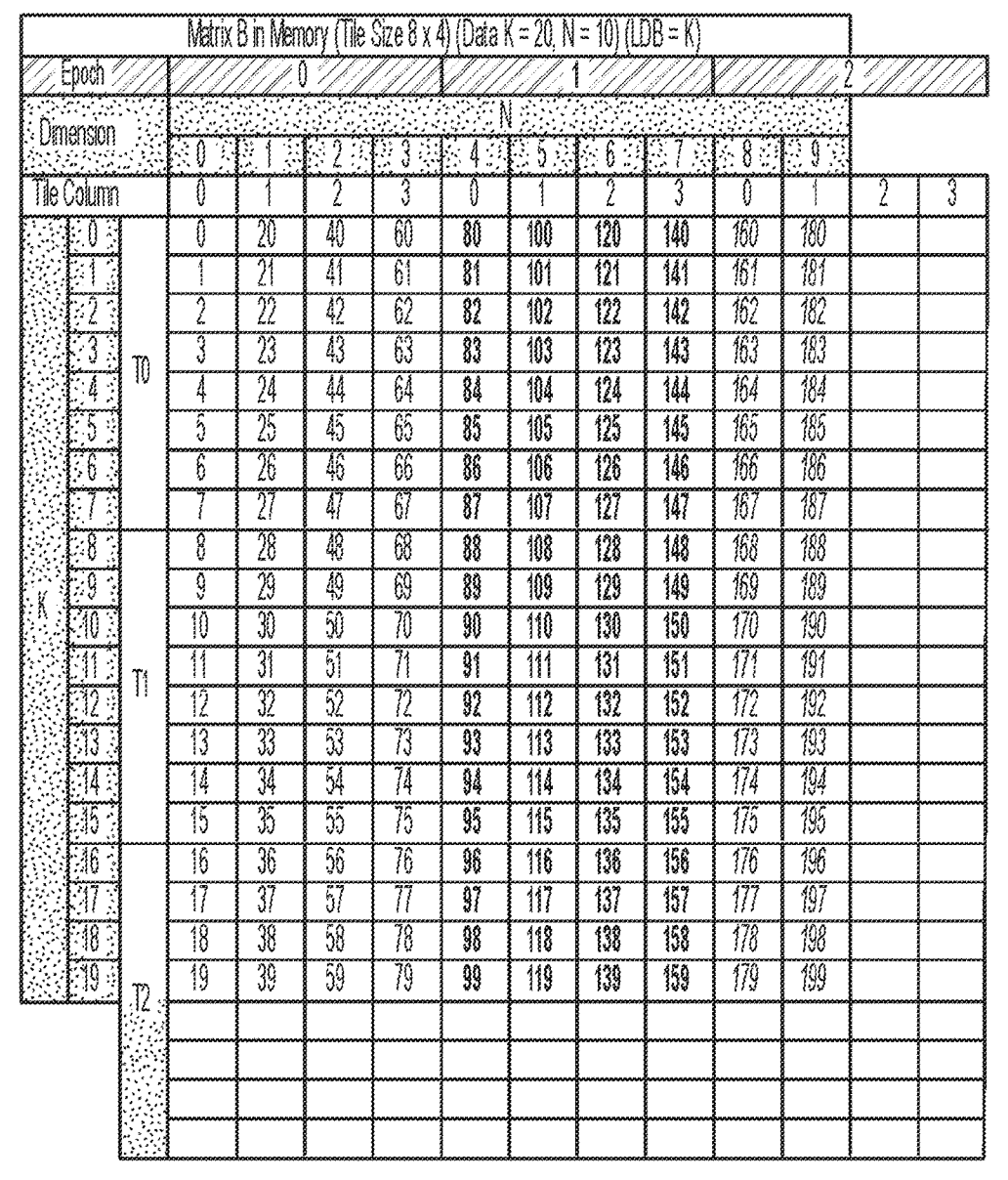
Figure 8B:
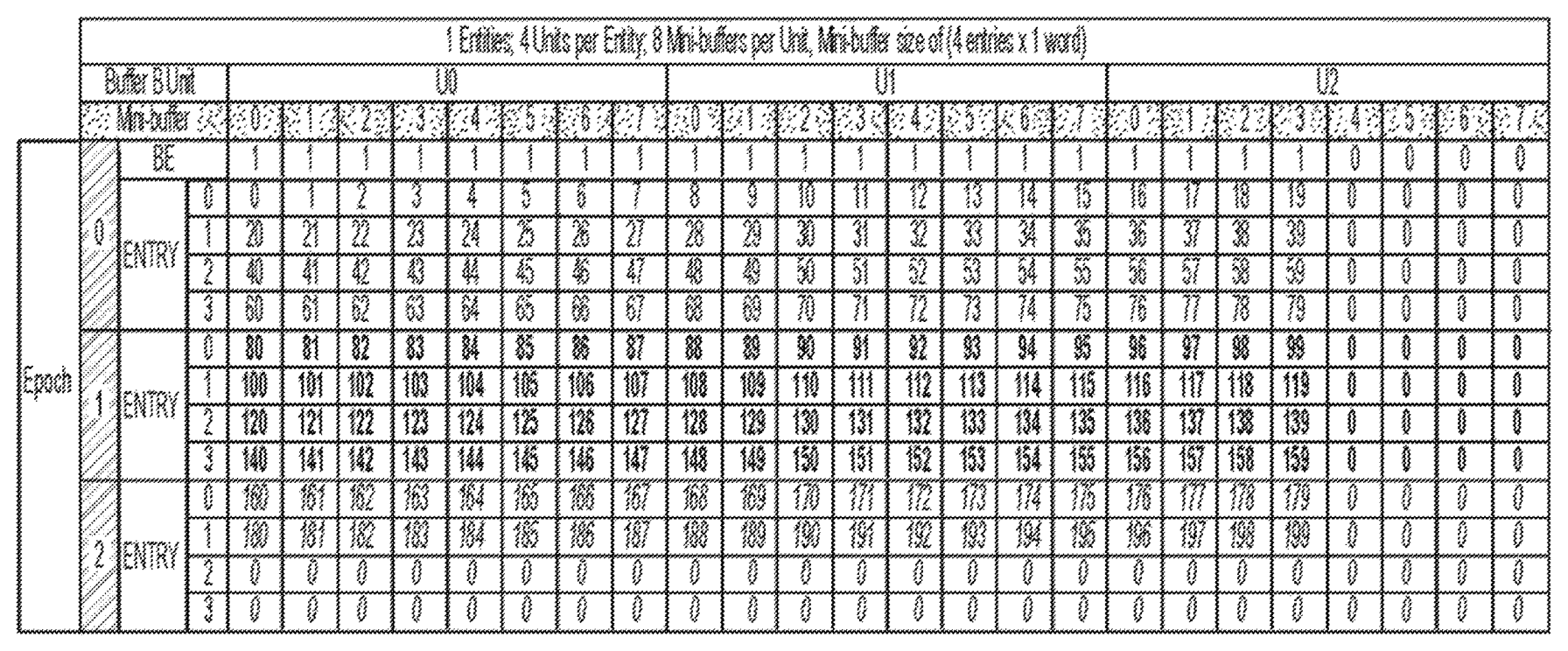

Referring to FIGS. 8A and 8B, both the load entity modules 150 and the load unit 155 may handle matrix transposing when a matrix is transposed while being fetched from memory. FIG. 8A is an example of a transposed matrix and shows the arrangement of the matrix in memory, and FIG. 8B shows the arrangement of the matrix in the three second inner buffer circuits 120 of three of the multiplying units 110 of an entity 105 with four multiplying units 110. Matrix tiles are fetched from memory as bursts, and loaded into second inner buffer circuits 120. The three second inner buffer circuits 120 are filled up at the same time with the data bursts shown in FIGS. 8A and 8B.

Figure 9A:
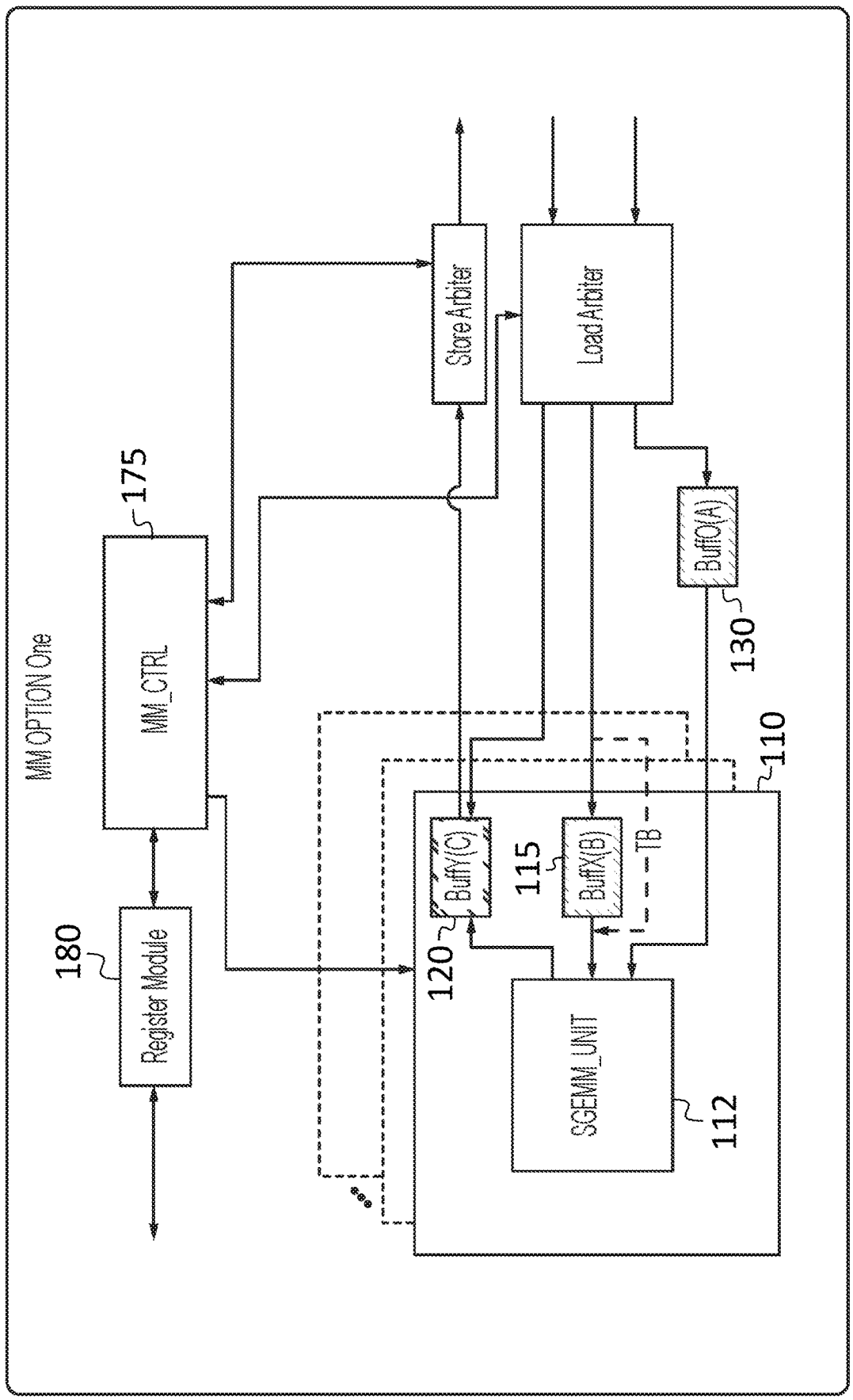
FIG. 9A is a block diagram of a circuit for matrix multiplication, according to an embodiment of the present disclosure.
Figure 9B:
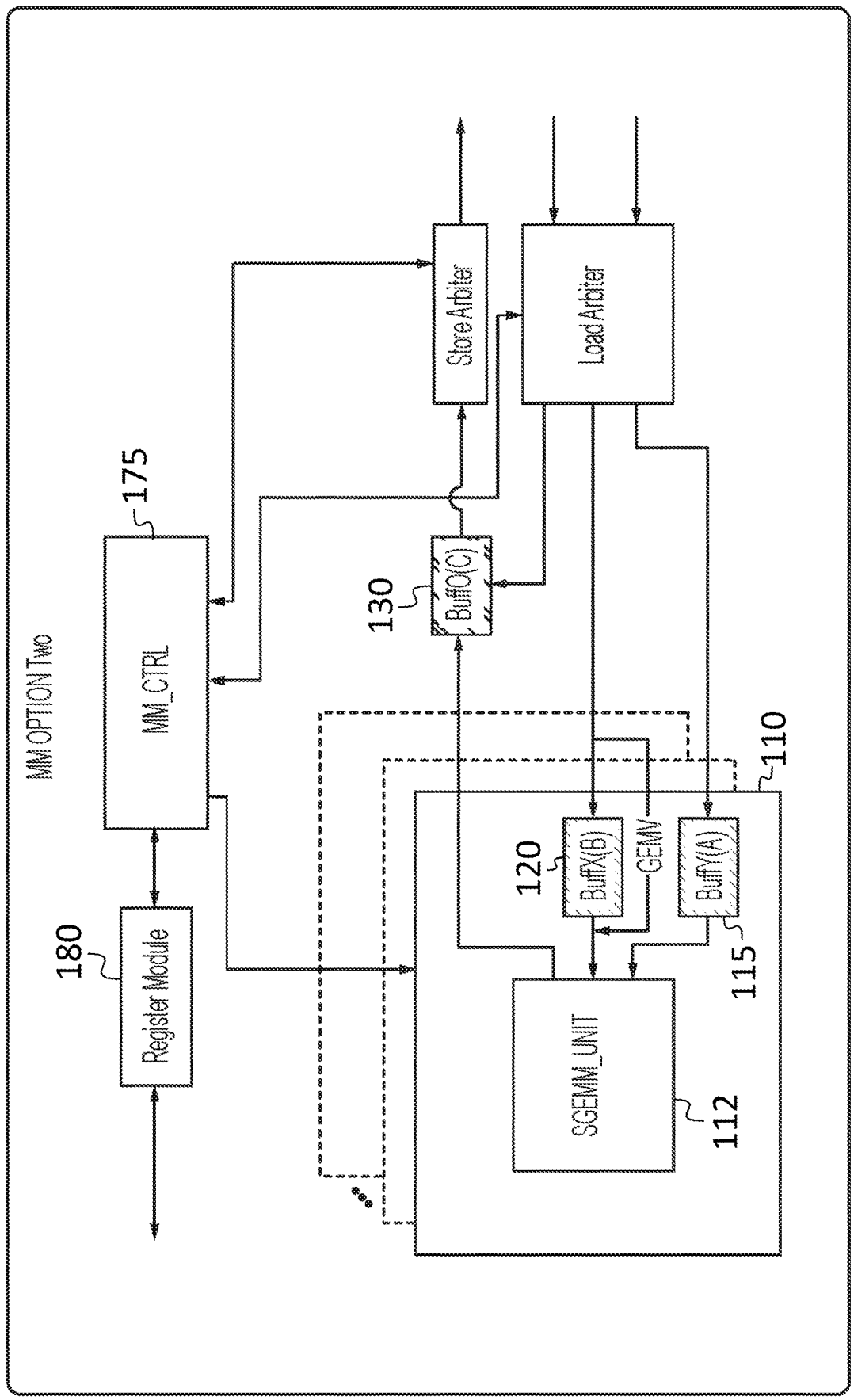
FIG. 9B is a block diagram of a circuit for matrix multiplication, according to an embodiment of the present disclosure.

FIGS. 9A and 9B show two different configurations of an adaptive matrix multiplier. In the configuration of FIG. 9A (which may be referred to as "Option One") the N dimension is the inner loop, and in the configuration of FIG. 9B (which may be referred to as "Option Two") the K dimension is the inner loop. The former (Option One) may be more efficient when the size of the calculation to be performed is large in the N dimension, and the latter (Option Two) may be more efficient when the size of the calculation to be performed is large in the K dimension. In some embodiments, referring to FIG. 9C (which supports both Option One and Option Two), multiplexers 905 are used to select between the two configurations. Each multiplexer may have three ports, including common port 910. The three multiplexers of FIG. 9C include a multiplying circuit input multiplexer having a common port 910 connected to an input of the multiplying circuit, a multiplying circuit output multiplexer having a common port 910 connected to an output of the multiplying circuit; and a second inner buffer circuit output multiplexer, having a common port 910 connected to an output of the second inner buffer circuit.

In a first state, which implements Option Two, the multiplying circuit input multiplexer is configured to route data from the second inner buffer circuit output multiplexer to a first input of the multiplying circuit, the multiplying circuit output multiplexer is configured to route data from the output of the multiplying circuit to the outer buffer circuit, and the second inner buffer circuit output multiplexer is configured to route data from the second inner buffer circuit to the multiplying circuit input multiplexer.

In a second state, which implements Option One, the multiplying circuit input multiplexer is configured to route data from the outer buffer circuit to the first input of the multiplying circuit, the multiplying circuit output multiplexer is configured to route data from the output of the multiplying circuit to the second inner buffer circuit, and the second inner buffer circuit output multiplexer is configured to route data from the second inner buffer circuit to the memory store circuit.

Figure 9C:
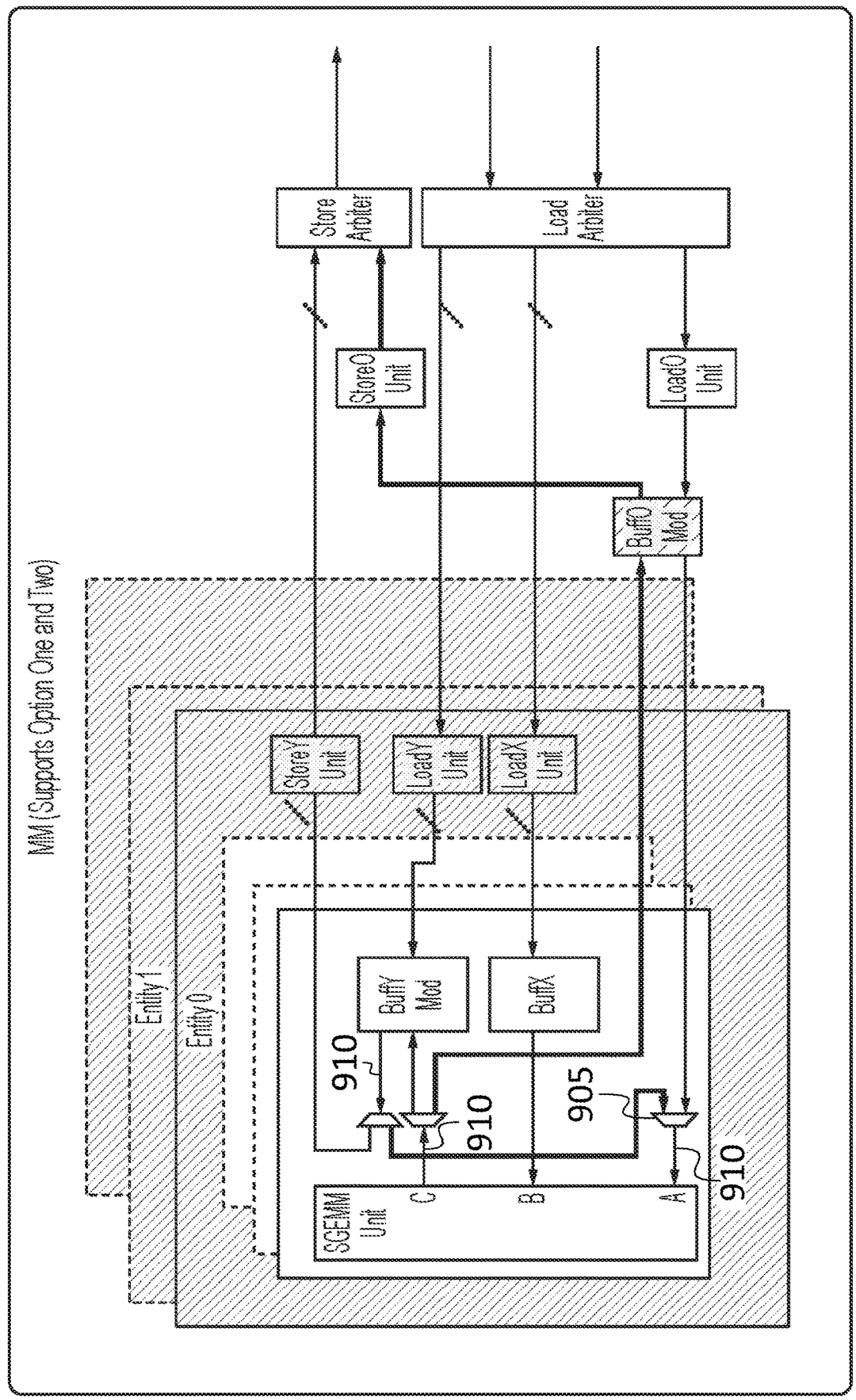
FIG. 9C is a block diagram of a circuit for matrix multiplication, according to an embodiment of the present disclosure.

The selection of one of the two configurations may be made at design time (e.g., it may be hard wired in an integrated circuit in which the adaptive matrix multiplier is fabricated) or it may be made at run time (using multiplexers, as shown in FIG. 9C). The multiplexers may be controlled by a host (through the register module 180), or they may be controlled automatically at run time by a special control circuit within the adaptive matrix multiplier.

In some embodiments the adaptive matrix multiplier or portions of it are implemented in a processing circuit. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

As used herein a "portion of" a thing means all or less than all of the thing. A such, a portion of a matrix may be all of the matrix, or a portion of the matrix that does not include all of the elements of the matrix. A rectangular or square portion of a matrix is itself a matrix. A "matrix product", of two matrices A and B (which may be written A×B) as used herein is the matrix the elements of which are $\Sigma_p$ A(i, p)*B(p, j); it includes the product of a matrix and a vector, and a dot product of two vectors, as special cases. As used herein "matrix multiplication" refers to the calculating of a matrix product.

In some embodiments, a general multiplier is configurable to support the following matrix multiplications by register settings:

(C:=A×B) (with A and B being matrices): matrix-matrix multiplication;

(C:=TA×B), (C:=A×TB) and (C:=TA×TB) (with A and B being matrices, and "T" preceding a matrix denoting the transpose operation): transposed matrix multiplications; and (Y:=A×X): matrix-vector multiplication as a special case of matrix-matrix multiplication.

The general multiplier may further be configurable to adaptively select the different multiplication options by the abstracted BufferX, BufferY and BufferO representing different A/B/C buffers based on the multiplication option selected. Memory burst transaction may be maximized with multiple units, multiple entities running in parallel.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of some embodiments.

The terminology used herein is for the purpose of describing particular embodiments only and is not intended to be limiting of some embodiments. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments, refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of an adaptive matrix multiplier have been specifically described and illustrated herein, many modifications and variations will be apparent to those skilled in the art. Accordingly, it is to be understood that an adaptive matrix multiplier constructed according to principles of this disclosure may be embodied other than as specifically described herein. The disclosure is also defined in the following claims, and equivalents thereof.

What is claimed is:

1. A method for performing multiplications via a system including at least one multiplying unit having at least one buffer circuit, the method comprising:
   in response to a first register of a processing circuit storing a first value, calculating, by the at least one multiplying unit, a matrix product of a first matrix and a second matrix, the first matrix being a first factor in the matrix product, and the second matrix being a second factor in the matrix product;
   in response to the first register storing a second value, calculating, by the at least one multiplying unit, a matrix product of a transpose of the first matrix and the second matrix, the transpose of the first matrix being the first factor in the matrix product, and the second matrix being the second factor in the matrix product;
   in response to the first register storing a third value, calculating, by the at least one multiplying unit, a matrix product of the first matrix and a transpose of the second matrix, the first matrix being the first factor in the matrix product, and the transpose of the second matrix being the second factor in the matrix product;
   in response to the first register storing a fourth value, calculating, by the at least one multiplying unit, a matrix product of the transpose of the first matrix and the transpose of the second matrix, the transpose of the first matrix being the first factor in the matrix product, and the transpose of the second matrix being the second factor in the matrix product; and
   in response to the first register storing a fifth value, calculating, by the multiplying unit, a matrix product of the first matrix and a vector, the first matrix being the first factor in the matrix product, and the vector being the second factor in the matrix product.

2. The method of claim 1,
wherein, the at least one multiplying unit includes a first multiplying unit and a second multiplying unit, and
wherein, the system further includes a memory load circuit and an outer buffer circuit,
the first multiplying unit comprising a first inner buffer circuit and a second inner buffer circuit,
the second multiplying unit comprising a first inner buffer circuit and a second inner buffer circuit,
the memory load circuit being configured to load data from memory, in a single burst of a burst memory access mode, into:
   the first inner buffer circuit of the first multiplying unit; and
   the first inner buffer circuit of the second multiplying unit.

3. The method of claim 2, wherein:
the first multiplying unit comprises an adder circuit, and
the first multiplying unit is configured:
   to form a first product, of:
      a first element of the first inner buffer circuit of the first multiplying unit, and
      a first element of the second inner buffer circuit of the first multiplying unit;
   to transmit the first product to the adder circuit;
   to form a second product, of:
      a second element of the first inner buffer circuit of the first multiplying unit, and
      a second element of the second inner buffer circuit of the first multiplying unit; and
   to transmit the second product to the adder circuit.

4. The method of claim 3, wherein the first multiplying unit comprises:
a first multiplying circuit, configured to form the first product; and
a second multiplying circuit, configured to form the second product.

5. The method of claim 3, wherein the adder circuit is configured:
to form a first sum, of the first product and the second product, and to send the first sum to the outer buffer circuit.

6. The method of claim 5, wherein:
the second multiplying unit comprises an adder circuit, and
the second multiplying unit is configured:
   to form a third product, of:
      a first element of the first inner buffer circuit of the second multiplying unit, and
      a first element of the second inner buffer circuit of the second multiplying unit;
   to transmit the third product to the adder circuit of the second multiplying unit;
   to form a fourth product, of:
      a second element of the first inner buffer circuit of the second multiplying unit, and
      a second element of the second inner buffer circuit of the second multiplying unit; and
   to transmit the fourth product to the adder circuit of the second multiplying unit.

7. The method of claim 6, wherein:
the adder circuit of the second multiplying unit is configured:
   to form a second sum, of the third product and the fourth product, and
   to send the second sum to the outer buffer circuit, and
the outer buffer circuit is configured to add the first sum and the second sum.

8. The method of claim 2, wherein:
the first multiplying unit comprises an adder circuit;
the first inner buffer circuit of the first multiplying unit comprises a first mini-buffer and a second mini-buffer;
the second inner buffer circuit of the first multiplying unit comprises a first mini-buffer and a second mini-buffer;
the first multiplying unit is configured:
   to form a first product, of:
      a first element of the first mini-buffer of the first inner buffer circuit of the first multiplying unit, and
      a first element of the first mini-buffer of the second inner buffer circuit of the first multiplying unit;
   to transmit the first product to the adder circuit;
   to form a second product, of:
      a first element of the second mini-buffer of the first inner buffer circuit of the first multiplying unit, and
      a first element of the second mini-buffer of the second inner buffer circuit of the first multiplying unit; and
   to transmit the second product to the adder circuit.

9. The method of claim 8, wherein:
the first multiplying unit is further configured:
   to form a third product, of:
      a second element of the first mini-buffer of the first inner buffer circuit of the first multiplying unit, and
      the first element of the first mini-buffer of the second inner buffer circuit of the first multiplying unit;
   to transmit the third product to the adder circuit;
   to form a fourth product, of:
      a second element of the second mini-buffer of the first inner buffer circuit of the first multiplying unit, and
      the first element of the second mini-buffer of the second inner buffer circuit of the first multiplying unit; and
   to transmit the fourth product to the adder circuit.

10. The method of claim 9, wherein:
the adder circuit is configured to form a first sum, of the first product and the second product, and to send the first sum to the outer buffer circuit; and
the outer buffer circuit is configured to store the first sum in a first element of the outer buffer circuit.

11. The method of claim 10, wherein:
the adder circuit is further configured to form a second sum, of the third product and the fourth product, and to send the second sum to the outer buffer circuit; and
the outer buffer circuit is configured to store the second sum in a second element of the outer buffer circuit.

12. The method of claim 2, wherein:
the first multiplying unit comprises an adder circuit; and
the first multiplying unit is configured:
   to form a first product, of:
      a first element of the first inner buffer circuit of the first multiplying unit, and
      a first element of the outer buffer circuit of the first multiplying unit;
   to transmit the first product to the adder circuit;
   to form a second product, of:
      a second element of the first inner buffer circuit of the first multiplying unit, and
      a second element of the outer buffer circuit of the first multiplying unit; and to transmit the second product to the adder circuit.

13. The method of claim 12, wherein the adder circuit is configured:
to form a first sum, of the first product and the second product; and
to store the first sum in a first element of the second inner buffer circuit.

14. The method of claim 12, wherein the first multiplying unit comprises:
a first multiplying circuit, configured to form the first product; and
a second multiplying circuit, configured to form the second product.

15. The method of claim 2, comprising a first entity and a second entity,
the first entity comprising the first multiplying unit, and the second multiplying unit.

16. The method of claim 15, wherein the memory load circuit is configured to receive read requests from the first entity and read requests from the second entity, and to arbitrate the read requests.

17. A method for performing multiplications, the method comprising:
calculating a matrix product of a first matrix stored in a first abstract buffer and a second matrix stored in a second abstract buffer; and
storing the matrix product in a third abstract buffer, wherein:
in response to a first register having a first value:
the first abstract buffer is mapped to a first physical buffer,
the second abstract buffer is mapped to a second physical buffer, and
the third abstract buffer is mapped to a third physical buffer; and in response to the first register having a second value:
the first abstract buffer is mapped to the first physical buffer,
the second abstract buffer is mapped to the third physical buffer, and
the third abstract buffer is mapped to the second physical buffer.

18. The method of claim 17, further comprising storing, in the first register, the first value or the second value, based on dimensions of matrices to be multiplied.

19. A method for performing multiplications, the method comprising:
reading a portion of a first matrix from memory in burst mode, into a first buffer in a first unit in a processing circuit and into a first buffer in a second unit in the processing circuit;
reading a portion of a second matrix from memory into a second buffer in the first unit in a processing circuit and into a second buffer in the second unit; and
calculating a matrix product of elements stored in the first buffer in the first unit and elements stored in the first buffer in the second unit.

20. The method of claim 19, wherein the first unit is in a first entity in the processing circuit, and the second unit is in a second entity in the processing circuit.

\* \* \* \* \*